(12) United States Patent
Iizuka et al.

(10) Patent No.: US 6,926,835 B2
(45) Date of Patent: Aug. 9, 2005

(54) WATER SOFTENING DEVICE

(75) Inventors: Hiroshi Iizuka, Tokyo (JP); Akikazu Yamamoto, Tokyo (JP); Tutomu Kurokawa, Tokyo (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 09/908,993

(22) Filed: Jul. 19, 2001

(65) Prior Publication Data

US 2002/0017495 A1 Feb. 14, 2002

(30) Foreign Application Priority Data

Jul. 21, 2000 (JP) ........................................ 2000-220874

(51) Int. Cl.$^7$ ........................... B01J 47/14; B01J 49/00; C02F 1/42
(52) U.S. Cl. ........................ 210/662; 210/670; 210/687; 210/96.1; 210/143; 210/191; 210/269; 210/284
(58) Field of Search ............................. 210/662, 670, 210/687, 96.1, 143, 190, 191, 269, 284, 739

(56) References Cited

U.S. PATENT DOCUMENTS

| | | | | |
|---|---|---|---|---|
| 3,383,310 A | * | 5/1968 | Ammer | 210/662 |
| 3,574,300 A | * | 4/1971 | Prosser | 210/96.1 |
| 4,320,010 A | * | 3/1982 | Tucci et al. | 210/662 |
| 4,332,678 A | * | 6/1982 | Spiegl | 210/96.1 |
| 4,539,106 A | * | 9/1985 | Schwartz | 210/190 |
| 5,639,377 A | * | 6/1997 | Banham et al. | 210/677 |
| 5,700,370 A | * | 12/1997 | Helmo | 210/94 |
| 5,811,012 A | * | 9/1998 | Tanabe et al. | 210/269 |

FOREIGN PATENT DOCUMENTS

| | | | |
|---|---|---|---|
| EP | 0423923 A1 | 4/1991 | |
| EP | 0741991 A1 | 11/1996 | |
| JP | 06015265 | 1/1994 | |
| JP | 9271753 | 10/1997 | ............. C02F/1/20 |
| JP | 10177019 | 6/1998 | .......... G01N/33/18 |
| JP | 10272370 | 10/1998 | |

OTHER PUBLICATIONS

EPO Search Report for EP App. No. 01 30 6296, dated Nov. 5, 2001 (identifying the above documents).

* cited by examiner

*Primary Examiner*—Ivars C. Cintins
(74) *Attorney, Agent, or Firm*—Darby & Darby

(57) ABSTRACT

Sampling pipes 21 and 22 are inserted, separated from outlet openings, into first and second water softeners 4 and 11. Raw water flows through first water softener 4, and raw water does not flow through second water softener 11. Once the hardness component concentration of the treatment water sampled by sampling pipe 21 reaches a specified concentration, the watercourse selection of valves 2 and 6 and valves 9 and 13 are switched, causing raw water to flow through second water softener 11. First water softener 4 is regenerated by salt water from a salt water chamber 14. The resulting water softening device prevents the leaking of hardness components, even with there is a fluctuation in the water quality of the raw water or when there is performance deterioration in the ion exchange resin.

21 Claims, 3 Drawing Sheets

WATER SOFTENING DEVICE

BACKGROUND TO THE INVENTION

The present invention relates to a water softening device for making soft water by a softening treatment (hardness removal treatment) of raw water that contains hardness components. In particular, the present invention relates to a water softening device that continuously produces soft water by having at least two water softeners installed in parallel with raw water flowing alternately through these water softeners.

As is well known, it is necessary to prevent the adhesion of scales inside cooling and heating machinery such as boilers, water heaters, cooling devices and the like. As a result, devices that remove the hardness components contained in the supplied water are connected to the water supply lines of the cooling and heating machinery. Of these, an automatic regenerating water softener with a system of removing hardness components by using an ion exchange resin has been widely used. This type of water softener uses a $Na^+$ type of ion exchange resin. Metal cations such as $Ca^{2+}$ or $Mg^{2+}$ and the like are displaced with $Na^+$ to remove the hardness components. When the above resin becomes saturated by displacement with cations and the resin loses its ability to remove hardness components, the resin is contacted with salt water to regenerate its functioning. In this situation, because soft water cannot be supplied during the regeneration operation, two water softeners are used. Water alternately passes through these water softeners, and soft water is supplied continuously.

With this type of conventional water softening device, the switching of the flow of water to a water softener is conducted by a timer. Due to errors or failures in the timer, there are situations where the plurality of softeners are simultaneously regenerated, and the flow of water is not possible. Alternatively, there are situations where the raw water simultaneously flows through a plurality of water softeners.

In order to overcome these shortcomings, in Japanese Laid Open Patent Publication Number 6-15265, a plurality of water softeners equipped with electromagnetic valves are connected in parallel on a soft water supply channel. Soft water supply operation is conducted alternately in these water softeners. After operating the water softener for a specified time or after passing a specified amount of water, in order to regenerate the ion exchange resin, one of the electromagnetic valves is closed, and a signal is sent via a communication line to the other electromagnetic valve and water softener. The electromagnetic valve is opened to operate the water softener. After a specified amount of time has passed or after a specified amount of water has been passed, this water softener begins its regeneration operation, and this electromagnetic valve is closed, and the other electromagnetic valve is opened. Through the communication line, the water softeners after being regenerated are alternately automatically operated.

With the operation method of this water softener, because the operation signal of one water softener is provided to a controller of the other water softener via a communication line, the regeneration operation and the soft water supply operation in each of the water softeners are never conducted simultaneously.

With the operation control method of the water softening device of the above Japanese Laid Open Patent Publication Number 6-15265, the ion exchange resin is regenerated after operating the water softener for a specified amount of time or after passing a specified amount of water. As a result, when the water quality of the raw water fluctuates and the concentration of hardness components becomes higher, or when the properties of the ion exchange resin within the water softener changes (deteriorates for example), there is the risk of leakage of hardness components.

OBJECT AND SUMMARY OF THE INVENTION

It is an object of the present invention to provide a water softening device which overcomes the foregoing problems.

It is a further object of the present invention to provide a water softening device that reliably prevents the leakage of hardness components, even when there is fluctuation in the raw water quality or when there are changes in the properties of the ion exchange resin.

The present invention is a water softening device, comprising at least two water softeners placed in parallel so that raw water will flow alternately through them; a common regeneration chamber for conducting regeneration of each water softener; a control device for controlling the switching of the flow of raw water to each water softener and for controlling regeneration; a hardness detection device for detecting hardness or a rise in hardness of treated water of the water softener; the control device controlling the switching of the flow of raw water and the regeneration of each water softener based on a hardness detection signal from the hardness detection device.

In this invention, the hardness component concentration of the treated water of the water softener is detected. The switching of the flow of raw water to the water softeners and regeneration is conducted based on this detected hardness component concentration. As a result, leakage of hardness is reliably prevented. With this, the hardness component concentration is detected for each predetermined water collection amount. The current detection value and the previous detection value is compared, and the extent of the rise is calculated. Based on this rise in detection value, the switching of the flow is implemented. Leaks can be detected even with the deterioration of the detection device.

Below, the hardness detection is described. In the present invention, in order to prevent leakage of hardness components even more reliably, the treated water from inside the ion exchange resin of the water softener is sampled. Preferably, the switching of the flow to the water softener and regeneration is controlled based on the hardness of this treated water.

With the water softening device of the present invention, a specified amount of ion exchange resin may still be present downstream from the treated water sampling site. As a result, by switching the flow of raw water and conducting regeneration when hardness components exceeding a specified value is detected from this sample water, the leakage of hardness components is prevented.

Furthermore, with the present invention, in order to prevent the leakage of hardness components almost completely, or in other words, to prevent hardness leakage resulting from failure of the hardness detection device or from failure of regeneration of the water softener or the like, a non-regenerating polisher is preferably provided subsequent to the water softener.

The above, and other objects, features, and advantages of the present invention will become apparent from the following description read in conjunction with the accompanying drawings, in which like reference numerals designate the same elements.

DETAILED DESCRIPTION OF THE INVENTION

Referring to the figures, an embodiment of the present invention will be described.

Figure 1:
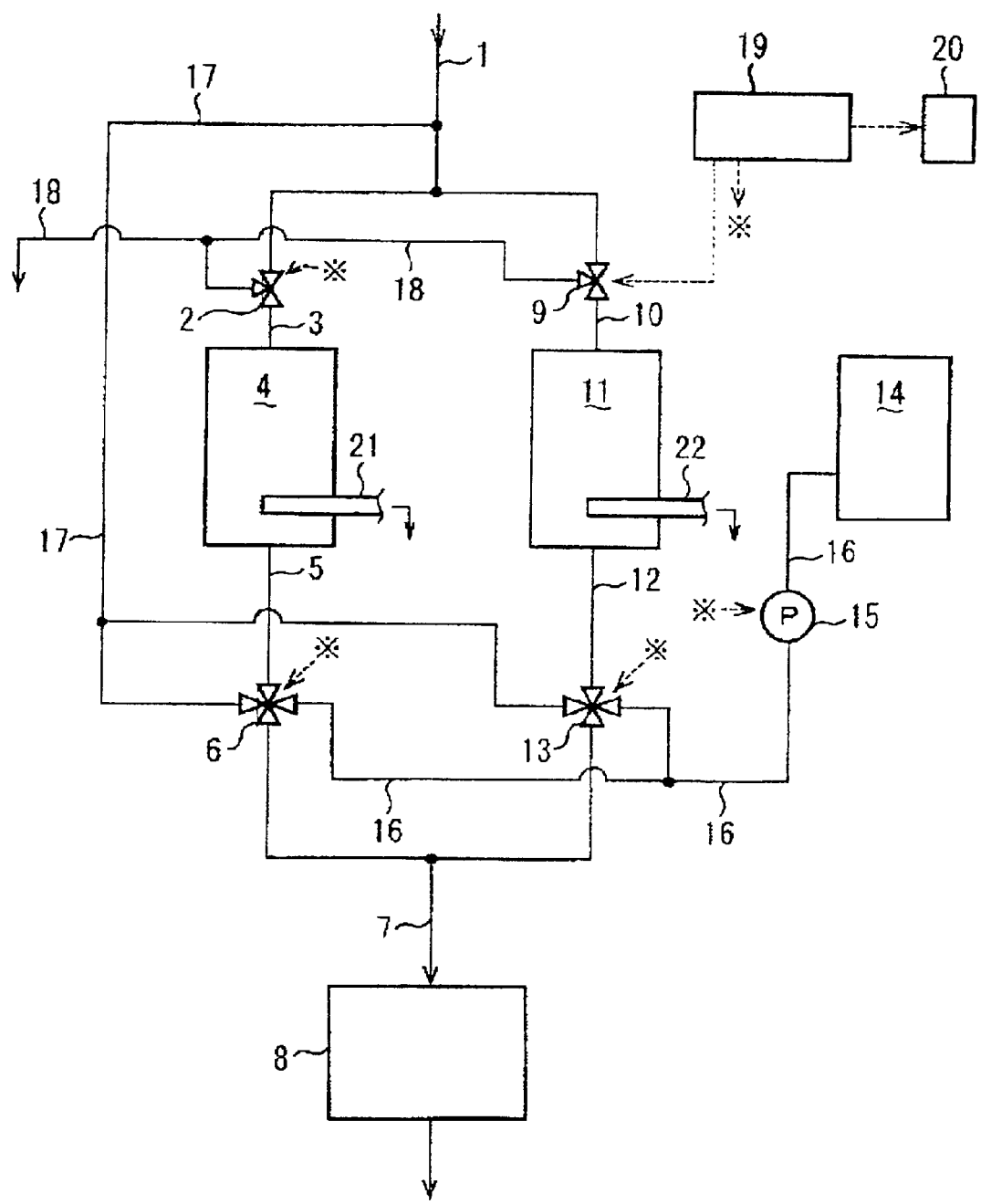
FIG. 1 is a system diagram of an embodiment of the water softening device according to the present invention.

Referring to FIG. 1, A water softener 4 and a water softener 11 are installed in parallel so that water will flow alternately through them. Raw water is introduced into first water softener 4 via a pipe 1, a three-way valve 2, and a pipe 3. Water softening treatment is then conducted, and soft water is removed via a pipe 5, a four way valve 6, a pipe 7, and a non-regenerating polisher 8. Raw water also flows, in order, from pipe 1 to a three way valve 9, a pipe 10, second water softener 11, a pipe 12, a four way valve 13, pipe 7, and non-regenerating polisher 8. The inside of polisher 8 is also filled with a $Na^+$ type ion exchange resin. Because the hardness component load of polisher 8 is extremely small, it is preferably made to be non-regenerating. In this preferred embodiment, the entire amount of ion exchange resin is replaced with new resin as needed.

In order to regenerate the ion exchange resin inside softener 4 and softener 11, salt water, from inside a salt water chamber 14, is brought into water softener 4 and water softener 11 via a pump 15, a pipe 16 and four way valve 6 or four way valve 13. In addition, in order to rinse the ion exchange resin with raw water after regeneration with salt water, a pipe 17, which branches from pipe 1, is connected to each four way valve 6 and four way valve 13.

In order to discharge the regeneration waste water, a discharge pipe 18 is connected to three way valve 2 and three way valve 9 of pipe 3 and pipe 10. These valves 2, 6, 9, 13, and pump 15 are controlled by a control device 19. A communication terminal 20, for sending control information to a control computer, is connected to control device 19.

In order to determine the timing for regeneration, a sampling pipe 21 and a sampling pipe 22 are each inserted inside water softener 4 and water softener 11. Sampling pipe 21 and sampling pipe 22 remove treatment water from the inside of the ion exchange resin layer at a specified distance away from the outflow port of water softener 4 and 11.

The hardness component concentration of the treatment water sampled with sampling pipe 21 or sampling pipe 22 is measured by a sensor. The sampled treatment water is checked for whether or not breaking has reached the sampling point. The measured values for this sensor are inputted into control device 19.

When operating this water softening device, on the one hand, for example, raw water is passed through first water softener 4, and on the other hand, raw water is not passed through second water softener 11. Of course, in this case, valve 2 connects pipe 1 and pipe 3, and valve 6 connects pipe 5 and pipe 7. Valve 9 blocks the connection of pipe 1 and pipe 10, and valve 13 blocks the connection of pipe 12 and pipe 7. Soft water is removed from non-regenerating polisher 8.

Once the hardness component concentration of the treatment water sampled by sampling pipe 21 reaches a specified concentration, the watercourse selection of valve 2, valve 6, and valve 9, valve 13 is switched. Raw water flows through second water softener 11. Soft water is removed from non-regenerating polisher 8.

While raw water is being passed through second water softener 11, salt water from salt water chamber 14 flows to first water softener 4 to conduct regeneration of the ion exchange resin. When conducting this regeneration, valve 6 connects pipe 16 and pipe 5, and valve 2 connects pipe 3 and pipe 18. Pump 15 operates to flow salt water from inside salt water chamber 14 through first water softener 4. The ion exchange resin inside of first water softener 4 is regenerated. The waste salt water is discharged via pipe 3 and pipe 18.

Pump 15 is stopped after passing a specified amount of salt water. Furthermore, valve 6 is switched, and pipe 17 and pipe 5 are connected. With this, raw water flows through first water softener 4, and any remaining salt water inside first water softener 4 is pushed out via pipe 3 and pipe 18. This completes the regeneration process. After completing regeneration, valve 2 and valve 6 are closed and water softener 4 is in standby mode until the next soft water production.

Raw water continues to pass through second water softener 11, and once the hardness component concentration of the treatment water sampled by sampling pipe 22 reaches a specified concentration, the flow of raw water is returned to first water softener 4, and second water softener 11 is regenerated.

In order to regenerate second water softener 11, of course, as with first water softener 4, salt water from salt water chamber 14 flows in order of pipe 16 and pipe 12. The waste salt water is discharged via pipe 10 and pipe 18. When rinsing, raw water is brought into second water softener 11 via pipe 17 and pipe 12, and residual salt water is pushed out via pipe 10 and pipe 18. After completing the rinse, second water softener 11 is in standby mode.

In this way, the flow of raw water through water softener 4 and water softener 11 is conducted alternately. While one is conducting soft water production, the other is conducting regeneration of the ion exchange resin.

The timing for the switching of this water softener 4 and water softener 11 is based on the hardness component concentration of the sampled water from sampling pipe 21 or sampling pipe 22. Even when the hardness component concentration of the sampling water reaches a certain value, ion exchange resin that is not broken down is still present between sampling pipe 21, sampling pipe 22 and the outflow ports of water softener 4 and water softener 11. As a result, the hardness components do not leak from water softener 4 or from water softener 11 during production of soft water. Even, if for some reason, some hardness components leak from water softener 4 or water softener 11, a non-regenerating polisher 8 is provided so that no hardness components leak from the output water of soft water.

Through communication terminal 20, hardness information and water sampling information from each of the water softeners is sent to a control computer. At the control computer, the data for sampling amount and the hardness leakage amount is maintained in a time series. By doing so, trends in decreased sampling amount or the total amount of the ion load on the non-regenerating polisher in the later step can be estimated. The timing for exchanging the resin inside the water softener or the timing for exchanging the non-regenerating polisher can be estimated.

Figure 2:
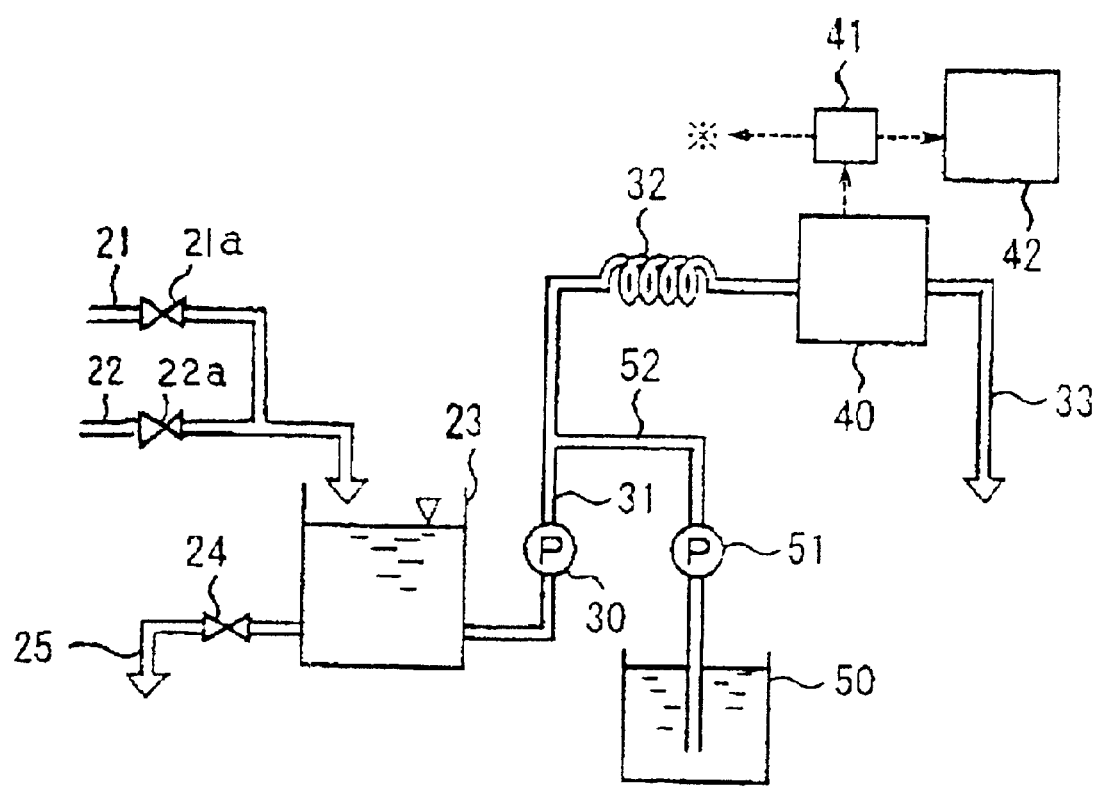
FIG. 2 is a system diagram of a hardness component concentration measurement device.

Referring to FIG. 2, a device suitable for measuring the hardness component concentration of the treatment water sampled with sampling pipe 21 and sampling pipe 22 is described.

Referring to FIG. 2, the sample water from each of sampling pipe 21 and sampling pipe 22 is brought into a water chamber 23 via a valve 21a and a valve 22a. Of course, when filling water from sampling pipe 21 into water chamber 23, valve 21a is opened, and valve 22a is closed. When filling water from sampling pipe 22 into water chamber 23, the opposite is done. This water chamber 23 is open to the atmosphere, and the soluble gases inside the soft water escape into the atmosphere. In addition, in this situation, the ends of pipe 21 and pipe 22 are placed at a position so that they do not contact the soft water inside water chamber 23. A blow pipe 25 that has a blow valve 24 is connected to the bottom of water chamber 23.

From the output port at the bottom of water chamber 23, water from the inside of water chamber 23 is removed at a constant amount and constant pressure via a pipe 31 with a tube pump 30. This soft water is brought to a hardness component measurement device 40 via a heat exchanger 32 of a capillary format or the like. After measuring the hardness component, the soft water is discharged via a discharge pipe 33. The soft water, after measurement, is returned to a demand site from discharge pipe 33. This is preferred from the point of view of water recovery.

Furthermore, a pipe 52 is connected to an intermediate point on pipe 31. Pipe 52 sends in a comparison standard solution from inside a comparison standard solution tank 50 via a pump 51.

The detection signal of hardness component detector 40 is inputted into a signal processing circuit 41 where it is calculated. Depending on this calculation result, control device 19 switches the flow of raw water to water softener 4 and water softener 11 and conducts control of regeneration. Circuit 41 is connected to connection terminal 42. This connection terminal 42 sends data by cable or wirelessly to a control computer (omitted in the figure). The sent data is stored as background information. In addition, alarms and the like can be communicated to the owner or the organization that is responsible for maintenance by electronic mail, fax, or mobile terminal and the like as necessary. With this, focused management can be conducted remotely.

Furthermore, a level detector (omitted in the figure), which detects the water surface, is installed in water chamber 23. When a specified water level is reached, valve 21a and valve 22a, provided on sampling pipe 21 and sampling pipe 22, are closed, preventing the introduction of any more soft water. Water chamber 23 is emptied every time the water quality is measured by blow valve 24. For the next measurement, new soft water is filled up to the specified water level. When filling water chamber 23 with water from sampling pipe 21 or sampling pipe 22, it is preferable to have a repeated washing of one to ten times by filling water chamber 23 with water first and then blowing the water by opening blow valve 24. This is in order to erase any influence from the previous measurement.

As described previously, the water inside water chamber 23 is supplied to hardness component measurement device 40 by tube pump 30, which can supply the water at a constant pressure and constant flow. By doing so, errors are prevented when using an ion electrode sensor for hardness component measurement device 40. The ion electrode sensor can have fluctuations in the detection value due to flow rate or pressure.

Furthermore, in order to maintain the test water at a constant temperature, heat exchanger 32 is installed in front of hardness component measurement device 40. This heat exchanger is used to maintain the test water at a constant temperature. It is particularly effective if it is the same temperature as the comparison standard solution which is used to determine any deterioration in hardness measurement device 40. By having the test water which is supplied from water chamber 23 and the comparison standard solution which is supplied from the comparison standard solution tank at the same temperature, the measurement voltages of the test water and the comparison standard solution can be correctly compared. Heat exchanger 32 is of a material that can conduct heat exchange, such as a stainless capillary tube or the like. It is preferable to maintain a passage by having anti-corrosion material in a coil-shape and the like.

Hardness component measurement device 40 takes advantage of the fact that when the hardness component concentration rises, the voltage measured by the hardness ion electrode rises. From the voltage values measured at constant time intervals, the current measurement value is compared with the previous measurement value. When their difference exceeds a constant value, this is determined to be a hardness leak.

At low concentrations of 1 ppm or less, the output voltage can fluctuate due to the various reasons described above, and the ion electrode (ion sensor) may not be able to differentiate these fluctuations with a fluctuating voltage due to hardness leaking. As a result, the hardness leakage is detected based on changes in the trend by comparing the previous measurement value with the current measurement value. In other words, when the difference between the previous measurement value and the current measurement value exceeds a set standard value, this is recognized to be a hardness leak. With this method, it is not always necessary to know the absolute value of the hardness component concentration. However, when the difference between the previous measurement value and the current measurement value is small, but the hardness leaking components are gradually rising, the hardness leak may not be detected. Because of this, it is preferable to add as a check a circuit that emits an alarm when the difference in the measurement voltages of the comparison standard solution and the test water exceeds a constant value.

Because the detection part of the ion sensor can change with age, periodic measurement of the amount of change according to the standard solution (comparison standard solution) is necessary. Corrections are necessary based on this comparison. When the value reaches below a constant standard value, the exchange of the sensor film is necessary. As a result, a comparison standard solution tank 50 is provided with an internal water level measure and a liquid supply pump 51. By the control of a surveillance control device, solution is periodically sent to measurement device 40, and the standard value is corrected. In addition, the timing for exchanging the sensor film and the timing for supplementing the comparison standard solution is communicated to the information center through the communication terminal, and the periodic service is conducted. In other words, for example, compared with the measurement voltage measured using the comparison standard solution immediately after exchanging the ion electrode film, when a subsequent measurement voltage falls below some constant value, this is judged to be a deterioration in the hardness component measurement device. Maintenance, such as the exchanging of the ion electrode film or the exchanging of the measurement device itself, is conducted.

The comparison standard solution inside comparison standard solution tank 50 is maintained by a level measure installed inside the tank. When the amount of solution falls below a constant value, there is a notification that supplementing of the comparison standard solution is necessary by an alarm and the like.

With this hardness component concentration measurement device, the measurement of the hardness component concentration of the soft water production can be conducted automatically over 24 hours. Furthermore, soft water is achieved without any hardness leaking. With a system that can notify with regard to the maintenance timetable, such as for the supplementing of the comparison standard solution and the exchange of the hardness measurement device film and the exchange of the measurement device and the like, the maintenance is conducted reliably, and a stable operation of the device is possible.

Figure 3:
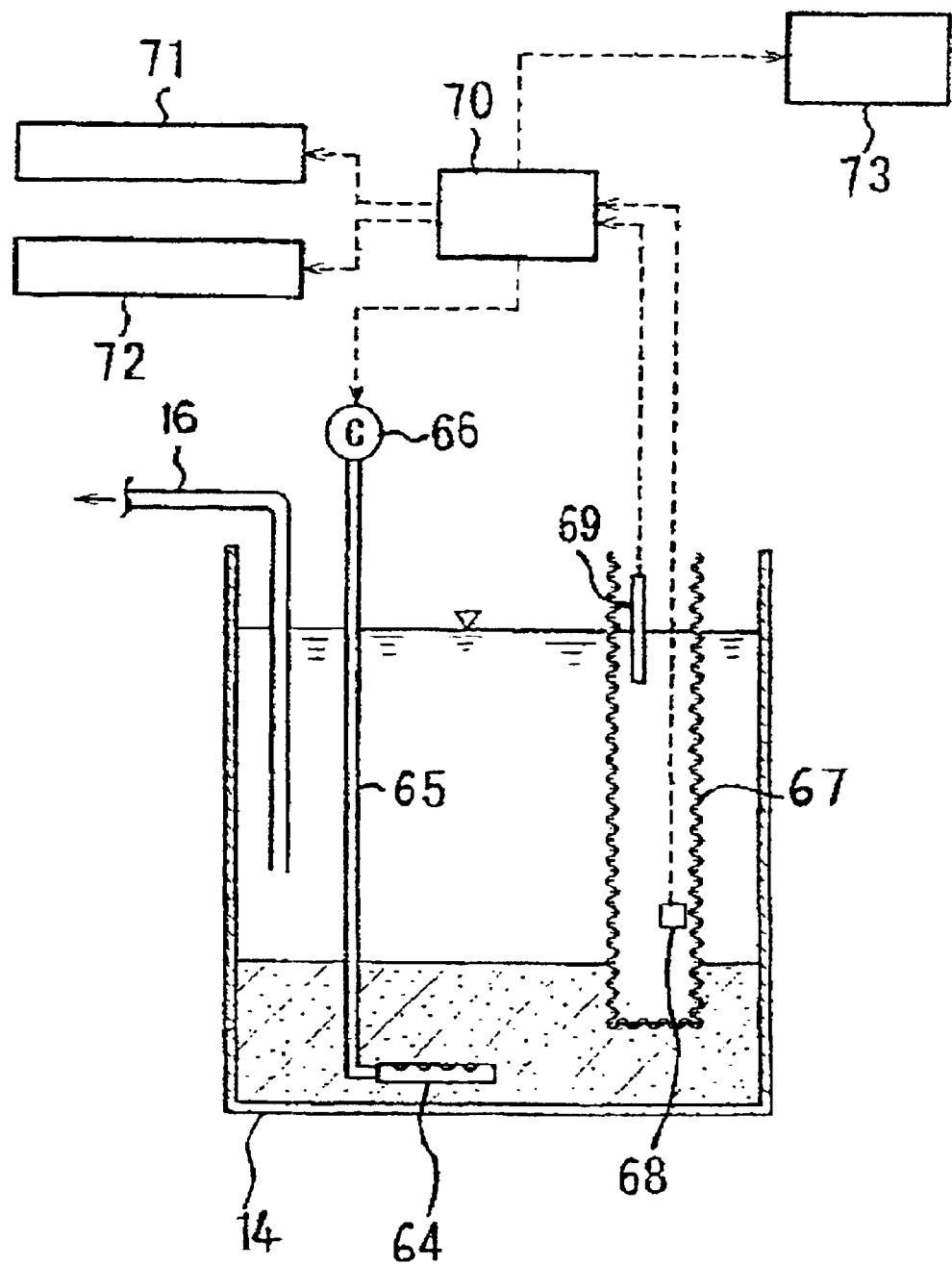
FIG. 3 is a system diagram of a salt water chamber used for supplying salt water.

Referring to FIG. 3, a preferred construction for salt water chamber 14 is described.

Salt water chamber 14 supplies salt water for regeneration to the water softeners via pipe 16 and pump 15. The raw water for preparing the salt water is brought into the chamber from pipe 1. Solid salt is precipitated and accumulated at the bottom of salt water chamber 14. In order to stir up this precipitated salt and to accelerate its dissolving, a diffusion pipe 63 as a agitation device is installed at the bottom of salt water chamber 14. Air is supplied from compressor 66 to diffusion pipe 64 via an air pipe 65.

In order to prevent direct contact between the undissolved salt and a concentration sensor 68, a mesh 67 is installed inside salt water chamber 14. Concentration sensor 68 and a water level sensor 69 are provided within the region surrounded by mesh 67. For this concentration sensor 68, a float type is inexpensive and suitable. In this float type, the buoyancy increases as the salt water concentration increases, and when the buoyancy exceeds a specified value, a signal is outputted. Concentration sensor 68 can also be a Na ion electrode, a Cl ion electrode, an inexpensive high performance electric conductometer, and the like.

For water position sensor 69, a float type is inexpensive and suitable. In the float type, when the water level inside salt water chamber 14 reaches a specified water level, the float activates a limit switch or lead switch or the like. Water position sensor 69 can also be an electrode type, an optical type, or ultrasonic type.

The output signals from sensor 68 and sensor 69 are inputted to a control device 70. Control device 70 provides a signal to compressor 66, a low concentration display device 71, and an alarm device 72. Furthermore, using a communication terminal 73, control device 70 sends data to a control computer and stores the operation history to this control computer. This data can be used for maintenance. Furthermore, various types, such as buzzers and lamps and the lf like, can be used for alarm device 72. For display device 71, various types, such as lamps, liquid crystal panels and the like, can be used.

In order to have the water level detected by water level 69 at a specified water level, raw water is brought into this salt water chamber 14 from pipe 1 via a branching pipe (not shown). When water level sensor 69 outputs a signal signifying that the specified water level has been detected, control device 70 looks up the concentration of concentration sensor 68. When this concentration is lower than the specified concentration, low concentration display device 71 displays that the concentration is low. In addition, compressor 66 is operated for a specified time, and air is blown out of diffusion pipe 64, and the salt inside salt water chamber 14 is agitated by bubbling. After a specified amount of time has passed, compressor 66 is stopped, and the concentration at concentration sensor 68 is determined. Compressor 66 is repeatedly operated until the specified concentration is achieved. Compressor 66 can also be continuously operated until the specified concentration is reached.

When the specified concentration is achieved, the display in the low concentration display device 71 is terminated. The salt water inside salt water chamber 15 remains until it is used for regeneration. Compressor 66 is preferably operated intermittently in order to prevent the consolidation of the precipitated salt.

When the salt water inside salt water chamber 14 is sent out from pipe 16 in order to regenerate water softener 4 or water softener 11, the detected water level of water level sensor 69 becomes lower than the specified water level. Afterwards, raw water is supplemented, and the detected water level returns to the specified water level. Therefore, by detecting the lowering and the raising of this detected water level by a signal from water level sensor 69, it can be detected that salt water has been used for regeneration. Referring to FIG. 3, agitation by diffusion of air is used as a means for raising the salt water concentration. However, screw agitation by a motor or convection agitation by heating with a heater is also possible.

With control device 70, when the salt water concentration that is sent out for regeneration is at a specified concentration, alarm device 72 is not activated. However, if the salt water is sent out when the salt water concentration has not reached the specified concentration (or when the specified concentration cannot be reached due to lack of salt), alarm device 72 is activated, and the person responsible is informed.

As described above, with the water softening device of the present invention, even when there is fluctuation in the water quality of the raw water or when there is performance deterioration in the ion exchange resin, leaking of hardness components can be prevented.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A water softening device, comprising:

at least a first water softener and a second water softener, each of the first and second water softeners having a sample conduit in fluid communication therewith for collecting a sample of treated water;

at least one regeneration chamber for conducting regeneration of each of said water softeners;

a hardness detection device for detecting the hardness of treated water from each of said water softeners, the hardness detection device being in fluid communication with the sample conduits associated with the first and second water softeners such that the sample of treated water can be withdrawn from one of the first and second water softeners and delivered to the hardness detection device;

a control device for controlling the flow of raw water to each of said water softeners and for controlling regeneration of each of said water softeners;

said control device controlling the flow of raw water and regeneration of each of said water softeners based on the difference between a previous measurement value and a current measurement value from the hardness detection device; and a sampling mechanism that samples treated water from inside a resin layer of each of said water softeners; wherein said hardness detection device detects the hardness of treated water sampled by said sampling mechanism.

2. The water softening device of claim 1, further comprising:

a non-regenerating polisher downstream of said water softeners with respect to the flow of raw water through said water softening device.

3. The water softening device of claim 2, wherein said non-regenerating polisher contains a Na+ type ion exchange resin.

4. The water softening device of claim 1, wherein:

said water softeners are placed in a parallel arrangement with respect to the water flow.

5. The water softening device of claim 4, wherein:

water flows alternately through said first water softener and said second water softener; and said control device performs regeneration of one of said first water softener and said second water softener when the other of said first water softener and said second water softener has water flow therethrough.

6. The water softening device of claim 1, wherein:

said at least one regeneration chamber is common to said first water softener and said second water softener.

7. A water softening device as described in claim 1, wherein the hardness detection device includes:

a chamber for collecting the sample of treated water via the sample conduit;

a hardness component measuring device in fluid communication with the chamber via a connector conduit; and a pump associated with the connector conduit for delivering the sample of treated water to the measuring device at a constant pressure and constant flow.

8. A water softening device as described in claim 7, further including:

means for maintaining the sample of treated water at a constant temperature.

9. A water softening device as described in claim 8, wherein the means comprises a heat exchanger associated with the connector conduit and disposed upstream of the measuring device.

10. A water softening method, the method comprising:

providing at least a first water softener and a second water softener, each of the first and second water softeners having a sample conduit in fluid communication therewith for collecting a sample of treated water;

conducting regeneration of each of said water softeners by using at least one regeneration chamber;

withdrawing the sample of treated water from one of the first and second water softeners by means of the respective sample conduit;

detecting hardness of treated water of said water softeners with a hardness detection device that is in fluid communication with the sample conduit and receives the sample of treated water therefrom, wherein the step of detecting the hardness includes the steps of:

sampling treated water from inside a resin layer of each of said water softeners; and detecting the hardness of treated water sampled;

controlling the flow of raw water to each of said water softeners by using a control device; and controlling regeneration of each of said water softeners by using said control device;

said control device controlling the flow of raw water and the regeneration of each of said water softeners based on the difference between a previous measurement value and a current measurement value from the hardness detection device.

11. The water softening method of claim 10, further comprising:

treating water downstream of said water softeners with respect to flow of raw water through said water softeners with a non-regenerating polisher.

12. The water softening method of claim 11, wherein said non-regenerating polisher contains a Na+ type ion exchange resin.

13. The water softening method of claim 10, wherein:

said water softeners are placed in a parallel arrangement with respect to raw water flow.

14. The water softening method of claim 13, wherein:

water flows alternately through said water softeners; and said control device performs regeneration of one water softener when the other water softener has water flow therethrough.

15. The water softening method of claim 10, wherein:

said at least one regeneration chamber is common to said first water softener and said second water softener.

16. The water softening method of claim 10, further including the steps of:

directing the sample of treated water through the sample conduit to a chamber for collection thereof;

linking the chamber to a hardness component device via a connector conduit; and providing a pump that is associated with the connector conduit for delivering the sample of treated water to the measuring device at a constant pressure and constant flow.

17. The water softening method of claim 16, further including the step of:

maintaining the sample of treated water at a constant temperature.

18. The water softening method of claim 17, wherein the step of maintaining the sample of treated water at a constant temperature comprises the step of:

disposing a heat exchanger along the connector conduit upstream of the measuring device and operating the heat exchanger so as to maintain the constant temperature.

19. A water softening device, comprising:

at least a first water softener and a second water softener placed in a parallel arrangement with respect to raw water flow, each of the first and second water softeners having a sample conduit in fluid communication therewith for collecting a sample of treated water;

at least one regeneration chamber for conducting regeneration of each of said water softeners;

a hardness detection device for detecting hardness of treated water of said water softeners, the hardness detection device being in fluid communication with the sample conduits associated with the first and second water softeners such that the sample of treated water can be withdrawn from one of the first and second water softeners and delivered to the hardness detection device; and a control device for controlling the flow of raw water to each of said water softeners and for controlling regeneration of each of said water softeners; and a sampling mechanism that samples treated water from inside a resin layer of each of said water softeners;

wherein said hardness detection device detects the hardness of treated water sampled by said sampling mechanism;

wherein water flows alternately first through said water softener and said second water softener;

wherein said control device performs regeneration of one water softener when the other water softener has water flow therethrough, wherein said control device switches water flow from one water softener to the other when the difference between a previous measurement value and a current measurement value from the hardness detection device exceeds a predetermined value.

20. The water softening device of claim 19, wherein:

said at least one regeneration chamber is common to said first water softener and said second water softener.

21. The water softening device of claim 19, further comprising:

a non-regenerating polisher downstream of said water softeners with respect to the flow of raw water through said water softening device.

* * * * *